(12) United States Patent
Wang (10) Patent No.: US 9,183,553 B2
(45) Date of Patent: Nov. 10, 2015

(54) ONCE CARD NUMBER GENERATION AND VALIDATION METHOD AND APPARATUS

(71) Applicant: Ynjiun Paul Wang, Cupertino, CA (US)

(72) Inventor: Ynjiun Paul Wang, Cupertino, CA (US)

( * ) Notice: Subject to any disclaimer, the term of this patent is extended or adjusted under 35 U.S.C. 154(b) by 0 days.

(21) Appl. No.: 14/251,616

(22) Filed: Apr. 13, 2014

(65) Prior Publication Data

US 2015/0294305 A1    Oct. 15, 2015

(51) Int. Cl.
*G06K 19/06*  (2006.01)
*G06Q 20/38*  (2012.01)
*G06Q 20/12*  (2012.01)
*G06Q 20/34*  (2012.01)

(52) U.S. Cl.
CPC ........ *G06Q 20/385* (2013.01); *G06K 19/06206* (2013.01); *G06Q 20/12* (2013.01); *G06Q 20/34* (2013.01)

(58) Field of Classification Search
USPC ...................................... 235/492, 439; 705/41
See application file for complete search history.

(56) References Cited

U.S. PATENT DOCUMENTS

| | | | |
|---|---|---|---|
| 2001/0013542 A1* | 8/2001 | Horowitz et al. | 235/380 |
| 2004/0035942 A1* | 2/2004 | Silverman | 235/493 |
| 2008/0067247 A1* | 3/2008 | McGregor et al. | 235/439 |
| 2008/0201265 A1* | 8/2008 | Hewton | 705/67 |
| 2009/0292641 A1* | 11/2009 | Weiss | 705/66 |
| 2013/0297503 A1* | 11/2013 | McGowan | 705/41 |
| 2014/0316873 A1* | 10/2014 | Sines | 705/14.17 |

* cited by examiner

*Primary Examiner* — Allyson Trail (57) ABSTRACT

A once card transaction system comprises a once card embedded with a once card number generator. The embedded once card number generator is able to communicate a once card number with a swipe card reader through the magnetic stripe emulator interface on the back of the card for in-store transaction or display it at the front of the card for online transaction. The embedded once card number generator is capable of generating an unpredictable once card number inside the once card without communicating with a central server. This distributedly generated once card number can be approved by an authentication entity by a valid OCN hashing list, and once the number is transacted, it is put on a rejection list.

3 Claims, 7 Drawing Sheets

ONCE CARD NUMBER GENERATION AND VALIDATION METHOD AND APPARATUS

RELATED APPLICATION

This application is a continuation-in-part of U.S. patent application Ser. No. 14/222,652, filed Mar. 23, 2014 by the present inventor, Ynjiun Paul Wang and entitled "Once Card Number Generation and Validation Method and Apparatus".

BACKGROUND

Credit card fraud has become worse in recent years. The source of the fraud is primarily due to the leaks of credit card number and other personal information. Although smartcard technology has been introduced for years, it is still not solving the problem due to that the credit card number is still acceptable without requiring digitally signed challenge in an in-store swipe card reader transaction, or an online shopping transaction. The current invention relates to a distributed unpredictable once card number (OCN) generation and validation method and apparatus. The once card number (OCN) can only be used once and will be rejected afterward if the same OCN is used again. This will eliminate majority of credit card number theft fraud due to the leakage of any used once card number (OCN). Furthermore, the validation server used for authenticating the OCN relies on checking if the hashing value of OCN is in a valid OCN hashing list or not. Even the valid OCN hashing list in the server is stolen, that may still take a long computation time for a hacker to recover a valid OCN, thus may dramatically reduce the risk of a centralized secure database attack fraud.

Certain related prior arts exist. For example, Citibank (New York) offered an online service called "Virtual Account Number" which required user to download a virtual number from a central server that can be used only once. The virtual number generator is either downloaded to the user's computer or accessed online. The user needs to return to the PC or website for a new virtual number for a subsequent transaction. Neither the merchant nor a credit card number theft can use the same number after a transaction is conducted. So copying a virtual account number once a transaction is done is like copying a receipt (or a history) that has no purchasing power any more. Therefore the card holder is protected from future fraudulent transaction due to the used virtual number has been recorded as a rejection number. The limitation of Virtual Account Number is that it requires Internet to generate a new number and only protect online transaction. For regular Point-of-Sales, it still uses the magnetic stripe card reader to read out a real account number that continue to be subject to the current credit card number skimming fraud.

Another related prior art disclosed by Kerry D. Brown in U.S. Pat. No. 7,472,829. It described a payment card with internally generated virtual account number (VAN) for its magnetic stripe encoder and user display. The embedded virtual account number generator is capable of generating the VAN autonomously without requiring feedback or other data return from the rest of the system. The payment card can display the VAN for online transaction and can program the magnetic stripe for POS transaction. The VAN will be moved to an exclusion list once it is used. Thus enjoy the security benefits for both online and POS transactions. It is an improvement off Citibank's Virtual Account Number which only covers online transaction security. However, the limitation of Brown's invention is that it relies on a "predictable" pseudo random generator with a provided user secret seed for authentication. Thus it cannot handle offline batch transactions if the card numbers submit are out of orders. Although in the disclosure, it relaxed the out of order sequence to be within 5 sequences. There still might be a chance of a valid batch transaction if 6 or more sequence away. Thus this renders Brown's approach not practical for offline transaction. Furthermore, once the secure central database of users' secret seeds been stolen, then the hacker can automatically generate sequence of all valid VANs without alerting the system. That is, Brown's invention is still vulnerable to a centralized secure database attack fraud.

SUMMARY

In one aspect, a once card in a plastic substrate with credit card dimensions is embedded a once card number generator capable of generating a new once card number in an unpredictable random sequence without communicating with a central server.

Additionally, the once card comprises a magnetic stripe emulator interface disposed in the rear surface of the card. The magnetic stripe emulator interface is connected to the once card number generator embedded in the card and capable of communicating a newly generated once card number with a legacy magnetic stripe card reader in a Point-of-Sales cash register terminal each time when the card is swiped.

Also the once card comprises a display and a button disposed in the front surface of the card. The display and the button are connected to the once card number generator embedded in the card and capable of displaying a newly generated once card number and expiration date for online shopping each time when the button is pressed.

Additionally, every randomly generated once card number is conformed to Visa or MasterCard format and can be cleared and used only once by the existing credit card clearance infrastructure. The used once card number will be put into the rejection card number list afterward.

The method of authenticating a once card number (OCN) includes computing the hash value of the OCN and optionally expiration date with a predetermined one-way hashing function. If the hashing value can be found in a user's valid OCN hashing list and passed a predetermined checksum test, then it is considered a valid OCN, otherwise return an invalid alert and increment a fraud attempt count by one. If a fraud attempt count is greater than a preset number said 3, an alert and an appropriate action will be triggered, for example, notify the account holder and freeze the account.

Furthermore, the validation server doesn't store any user sensitive information such as a user private key, a One-Time Password generator secret seed, etc. The server only stores public available information such as user's public key and user's name as shown on the card as well as a user's valid OCN hashing list. Thus this architecture might dramatically reduce the risk of a centralized secure database attack fraud. Because even if a hacker breaks into the validation server and steals all the user public keys, their names, and their valid OCN hashing list, it might still take a long time for a hacker to recover a valid OCN.

DETAILED DESCRIPTION

Figure 1:
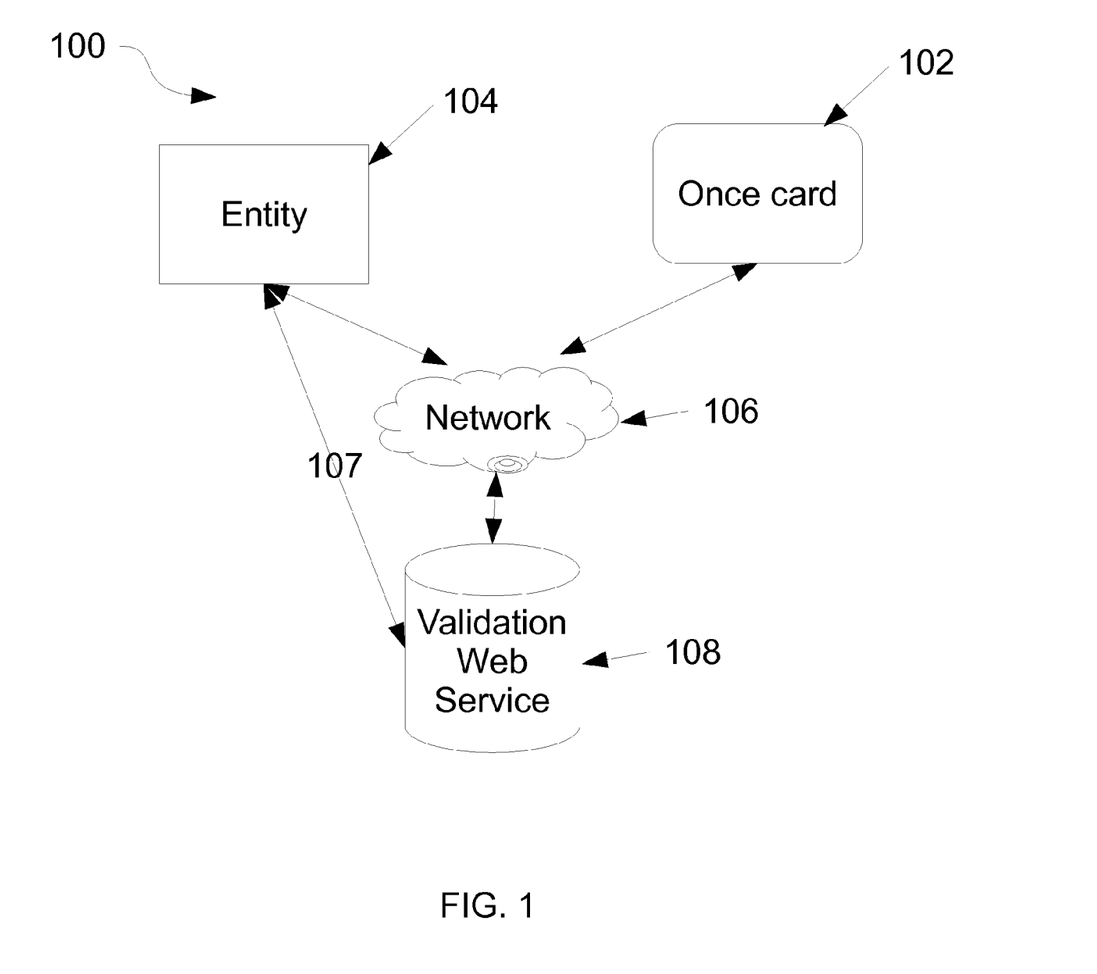
FIG. 1 illustrates one embodiment of once card number system including a network, a validation web service, a once card, and an entity requesting for once card number validation.

FIG. 1 is a schematic block diagram illustrating an example system 100 for generating and validating a once card number. In this example, the system 100 includes a network 106, a once card, such as a once card 102, an entity requesting for validation 104, and a once card number validation web service 108. In the example system, the entity 104 and the validation web service 108 are in communication either directly via communication path 107 or via the network 106 using wired and/or wireless communication schemes.

Although the entity requesting for a once card number validation 104 is typically an issuer bank such as Citibank who issues a once card 102 to a consumer, it also could be a payment processing company such as First Data Corporation (Atlanta, Ga.), an acquiring bank who provides merchant banking service or a credit card association such as Visa or MasterCard. Any of the above mentioned entity or third party entity or even an individual can request once card number validation web service going through either a network 106 or a direct connected communication path 107 with wired and/ or wireless communication schemes.

Once card 102 will generate a once card number (OCN) when each transaction occurs. For example, when a user swipes a once card 102 in a Point-of-Sales (POS) terminal, the once card will automatically generate a new OCN and communicate with the legacy swipe card reader through the built-in magnetic stripe emulator interface disposed at the back side of the once card for an in-store transaction. In another example, when a user presses the built-in button at the front side of the once card, the once card will automatically generate a new OCN and display the OCN at the built-in display at the front side of the card. Then the user can copy the OCN and expiration date and manually enter them into a website for an online transaction.

As a typical credit card clearance process, the OCN might go through several entities before arriving at issuer bank entity 104 for transaction authorization. For example, the issuer bank entity 104 can send the OCN, expiration date and card holder's name or an entire magnetic stripe Track 1 information to the Validation Web Service 108 through a network 106 and request for OCN authentication. If the OCN is valid, the Validation Web Service 108 will return a valid message and then add the OCN into a rejection list to prevent future reuse of the same OCN. The Validation Web Service can also be connected locally through direct communication path 107 to the entity 104.

In another embodiment, the validation request entity 104 can be a payment processor and the validation web service 108 can be connected directly to it through a communication path 107 or a network 106.

Figure 2:
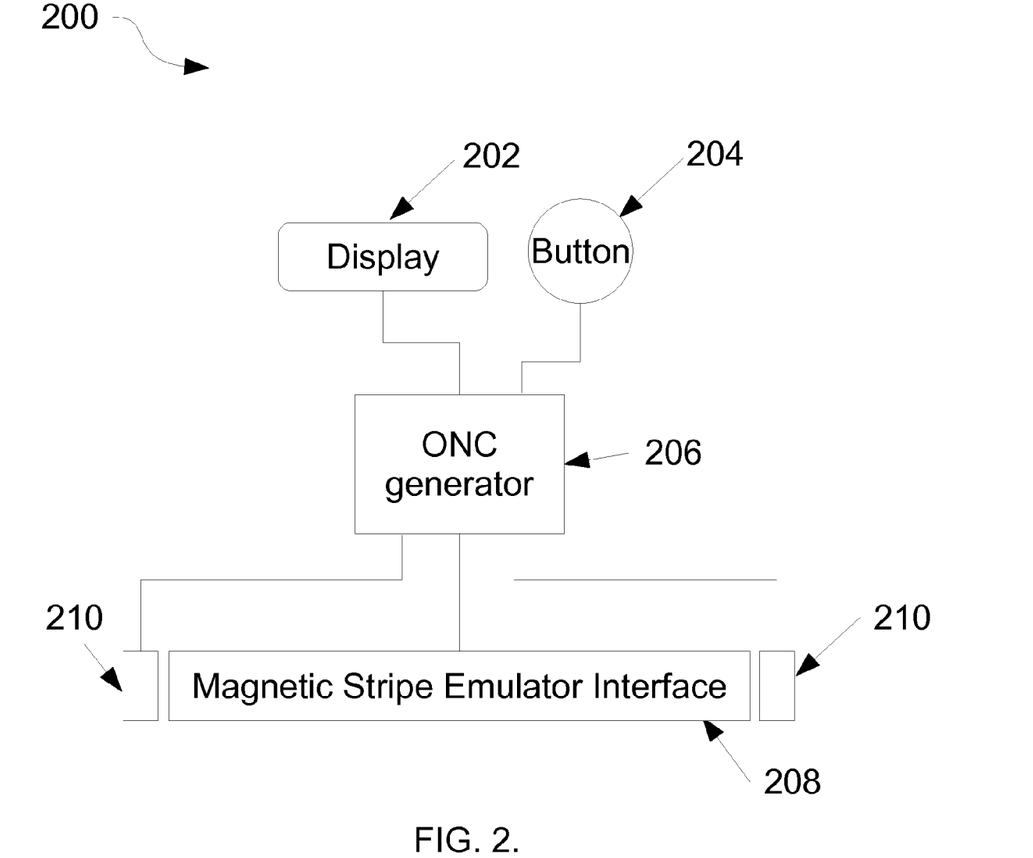
FIG. 2 illustrates one embodiment of a once card functional block diagram.

FIG. 2 illustrates an example of a once card functional block diagram 200. In this example, the once card 200 includes a display 202, a button 204, an OCN generator 206, a magnetic stripe emulator interface 208 and two magnetic stripe sensors 210 at each end of the magnetic stripe emulator interface 208. The OCN generator 206 is connected to the display 202, the button 204, the magnetic stripe emulator interface 208 and two sensors 210. The OCN generator 206 will generate a new OCN upon the button 204 is pressed or the sensor 210 senses a magnetic stripe card reader head in contact with the once card.

One of the preferred embodiments of the display 202 is an e-ink display for its durability and power saving feature. An e-ink display does not consume any power while displaying and only consumes power when it changes the content. This is particularly suitable for a once card application, which for its life time, it might only change content about 1,000 to 3,000 times. Due to its paper-like flexible construction, it is more rugged for bending compared with a LCD display. However, it is also conceivable using a LCD display or other display for the current invention.

One of the preferred embodiments of the OCN generator 206 consists of a flash memory pre-stored a list of valid OCN said 1,500 of them. Each time when the button 204 is pressed, the OCN generator will select an unused OCN from a OCN table stored in the flash memory then display the selected OCN. Or each time when the sensor 210 senses a card reader head is in contact with the once card, the OCN generator will select an unused OCN from a OCN table stored in the flash memory then display the selected OCN and formats the OCN into the Track 1 information to communicate with a legacy magnetic stripe card reader through its magnetic stripe emulator interface 208.

Another preferred embodiment of the OCN generator 206 consists of a logic circuit that implement a pre-determined algorithm such as a One-Time Password (OTP) generator defined by OATH standard. The specification of OATH standard can be accessed from the website http://www.openauthentication.org/specification. One of the prior arts is, for example, an Event Based OTP E-1-0-11 series smartcard manufactured by SmartDisplayer, Inc. in Taiwan. The features of the prior art are listed at http://www.smardisplayer.com/Event_OTP_P_List.htm.

One of the preferred embodiments of the magnetic stripe emulator interface 208 can be like that disclosed in a prior art U.S. Pat. No. 4,791,283 by Norman S. Burkhardt and titled TRANSACTION CARD MAGNETIC STRIPE EMULATOR, herein incorporated by reference in its entirety. Multiple magnetic field generators can be embedded in a plastic card substrate to form magnetic stripes which emulate multiple tracks on a conventional transaction card. Each separate magnetic generator has a separate drive coil for sequentially generating magnetic data on each of the magnetic field generator. The traditional magnetic stripe contains three tracks, each 0.11 inches wide. Track 1 and 3 are typically recorded at 210 bits per inch, while Track 2 typically has a recording density of 75 bits per inch. Each track can either contain 7-bit alphanumeric characters, or 5-bit numeric characters. Track 1 standards were created by the airlines industry (IATA). Track 2 standards were created by the banking industry (ABA). Typically the Track 1 of a financial card contains Start sentinel of 1 character ('%'), Format code='B' of 1 character (alpha only), Primary account number (PAN) up to 19 characters, usually matches (but not always) the credit card number printed on the front of the card, Field separator of 1 character (generally '^'), Name of 2 to 26 characters, Field Separator of 1 character (generally '^'), Expiration date of 4 characters in the form YYMM, Service code of 3 characters, Discretionary data of up to 21 characters, End sentinel of 1 character (generally "?") and Longitudinal redundancy check (LRC) of 1 character. The total length of track 1 cannot exceed 79 characters. The Track 2 contains a subset of Track 1 information. Table 1 as shown below is an example of Track 1 and Track 2 information

TABLE 1

| Track 1 | %B5426241101279480^SMITH/JAMES<br>^12091011956110127948672065331320? |
|---|---|
| Track 2 | ;5426241101279480=12091011956110127948? |

Figure 4:
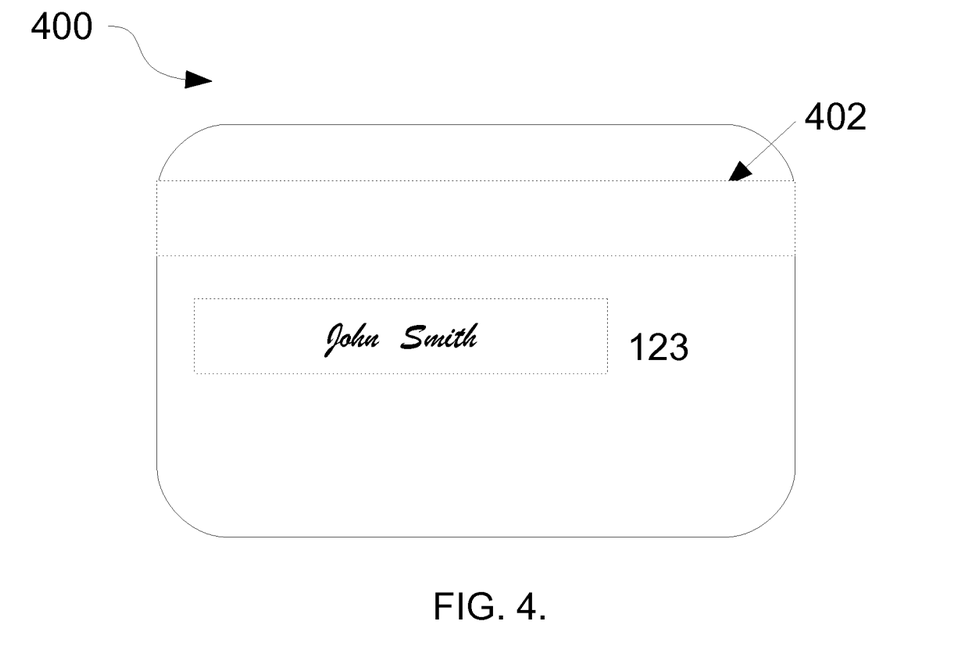
FIG. 4 illustrates a rear view of one embodiment of the once card.

The current invention of the once card will implement at least one magnetic field generator across the card dimension shown at the back view 402 in FIG. 4 to emulate Track 1 information using a magnetic field generator to encode information in the time domain rather than in spatial domain. That is the entire magnetic stripe emulator interface is modulated by the OCN generator 206 to drive the coil (not shown) to transmit bit by bit information while the card is swiped through a legacy magnetic card reader. The relative card swiping speed is not important as long as the period of swiping is long enough to allow the emulator interface 208, 402 to transmit the entire Track 1 information. Track 2 information is a subset of Track 1 including: PAN, Expiration date, Service code and Discretionary data. It is known to the field of the art that a second and a third magnetic field generator can be placed parallel to the first one to emulate the Track 2 and Track 3 of a traditional magnetic stripe layout.

Another less preferred embodiment of the magnetic stripe emulator interface 208 can be like that described in U.S. Pat. No. 7,472,829 by Kerry Dennis Brown, and titled PAYMENT CARD WITH INTERNALLY GENERATED VIRTUAL ACCOUNT NUMBERS FOR ITS MAGNETIC STRIPE ENCODER AND USER DISPLAY, herein incorporated by reference in its entirety. Due to various technology limitation of this prior art, it has been proven that it might have manufacturability issue in mass production thus is a less preferred embodiment.

Figure 3:
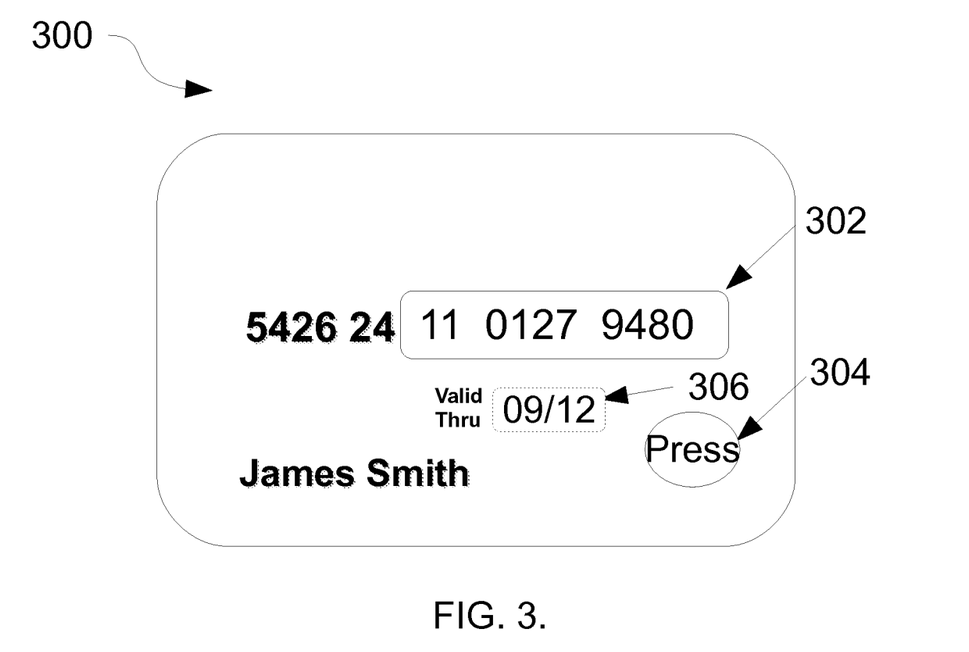
FIG. 3 illustrates a front view of one embodiment of a once card.

FIG. 3 illustrates a front view of an example once card 300 with dimensions of a credit card for generating and displaying an OCN. In one of preferred embodiments, the display 302 is with size of displaying 10 digits as shown in FIG. 3. Since the first 6 digits of an OCN is typically a bank identification number (BIN) or an issuer identification number (IIN) which are fixed, thus they won't be displayed in the display 302 but printed or embossed directly on the card as shown in the FIG. 3. The expiration date display 306 is optional. If the OCN generation algorithm includes generating the expiration date, then the display 306 is needed, otherwise, the expiration date can be printed on the card. Each time when the button 304 is pressed, a new OCN is generated and displayed on the display 302. There are two modes for the display: auto cleared mode and manual cleared mode. If in auto cleared mode, the content displayed will be cleared at certain predetermined period, for example, 60 sec. In manual cleared mode, the content displayed will stay until button pressed again then the content will be cleared.

A rear view of the example once card 400 is provided in FIG. 4. The magnetic stripe emulator interface 402 is disposed at the top portion of the back side of the once card according to the credit card specification. Upon the sensors 210 at the both end of magnetic stripe emulator interface 402 sense the once card been swiped, the OCN generator will generate a new Track 1 information with newly generate OCN and then drive the emulator coil for sequentially transmit the Track 1 data to a legacy magnetic stripe card reader while the once card is swiped through the reader.

Figure 5:
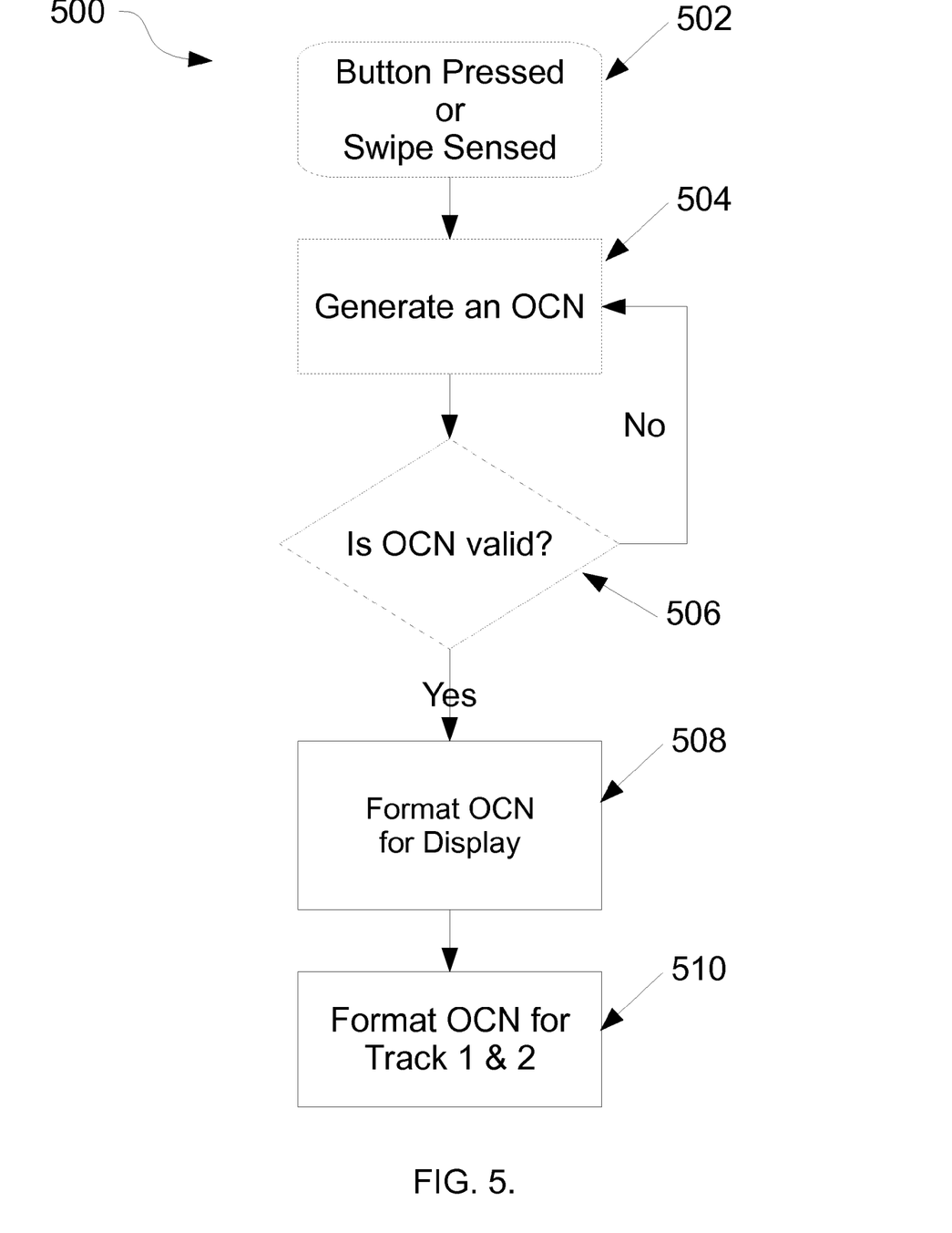
FIG. 5 is a flow chart of an example method of the steps the once card number generator performs to generate a once card number.

FIG. 5 illustrates a flow chart of an example method 500 of the steps the once card number generator performs to generate a once card number. In the step 502 upon the button 204 or 304 is pressed or the sensors 210 sense the card is swiped, the OCN generator is triggered to generate a new OCN. In one of the preferred methods, 1,500 OCNs, for example, are pre-generated by a random number generator in an external secure computer. Each OCN is 20-digit in length. Then the pre-generated random OCNs are written into a once card flash memory in an OCN table during the provisioning process 700 that will be described later. The step Generate an OCN 504 thus randomly select an unused OCN from OCN table in the flash. In one of preferred embodiments, since the OCN table is generated by a random number generator, by nature, if the OCN generator maintains a counter by selecting the OCN from the OCN table sequentially each time, it will meet both requirements of a random OCN and an unused OCN. The step 506 checks whether the OCN is a valid OCN or not. This might include checking the expiration date if the OCN table includes expiration date for each OCN, checking if the OCN has been used before, etc. If the result is invalid, then it needs to go back to step 504 to generate another new OCN. In one of the preferred embodiments using a table counter implementation as described in step 504, the step 506 only need to check the expiration date and whether it is end of the table. If it is, then it needs to signal on the display indicating the once card is running out of OCN. In a typical usage frequency of a credit card, 1,500 OCNs could last about 3 years which is roughly matching the life of a credit card with a battery. In the step 508, the example OCN generator will extract the leading 9-digit out of the 20-digit OCN as the OCN9, for example, as shown in the first row OCN of Table 2 and OCN9 of Table 3, respectively. The display will display the OCN9 plus one Luhn checksum digit, for example, as shown in 302 FIG. 3. If the OCN table also includes the expiration date for each OCN, then OCN generator will also display the expiration date on the expiration date display 306 as shown in FIG. 3. In the step 510, the Track 1 and Track 2 information will be updated according to a new PAN, optionally new Expiration date and a new Discretionary Data, for example, as shown in Table 1 using the first row OCN of Table 2 and OCN9 of Table 3, respectively. A new Primary Account Number (PAN) will be constructed by using the fixed 6-digit IIN, for example '5426 24' as shown in FIG. 3, pre-stored in the OCN generator flash memory during the provisioning process, concatenated with 9-digit OCN9 and plus one digit Luhn checksum. The expiration date will be either a fixed date pre-stored in the OCN generator flash memory during the provisioning process or a dynamic date associated with each newly generated OCN as described in step 506.

In another preferred embodiment, the step Generate an OCN 504 can employ a pre-determined algorithm such as a One-Time Password (OTP) generator specified by OATH. The provisioning process involves setting a secret seed for the OTP generator in the once card. In the step 506, then need to check a previously generated used OCN to see if the new OCN has been used before. If it is used before, then it need to go back to step 504 again to generate a new OCN again. The OTP can be set to generate 20-digit and leading 9-digit will be OCN9. Then the step 508 and 510 will be the same as described in the previous paragraph.

Figure 6:
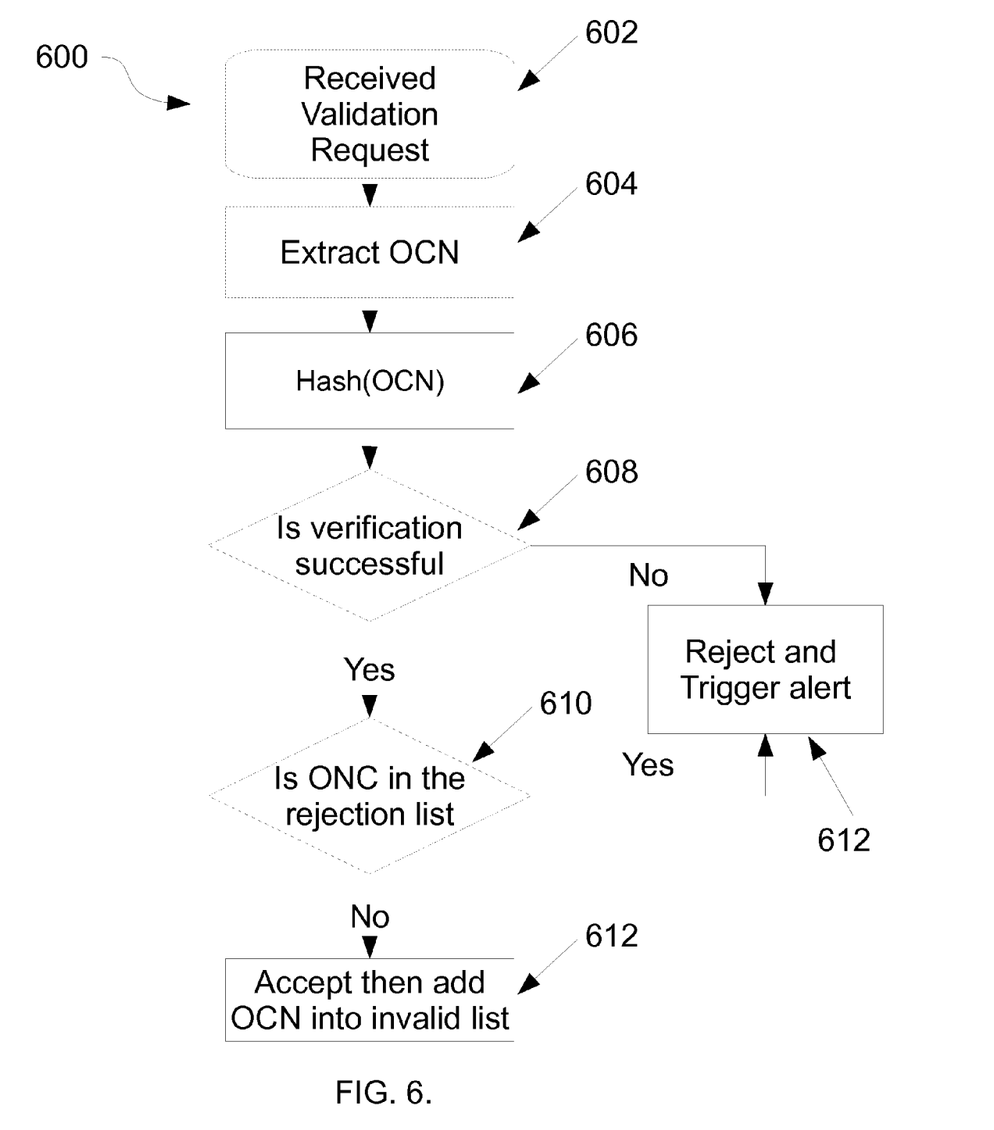
FIG. 6 is a flow chart of an example method of the operation of a validation web service authenticating a once card number.

FIG. 6 illustrates a flow chart of an example method 600 of the steps of a validation web service authenticating a once card number. In step 602, the web service might receive a validation request from an issuer bank, or a data processor, or a merchant bank, or Visa/MasterCard, or other entity. In the step 604, the web service will extract the 20-digit OCN from either Track 1 or Track 2 Discretionary data if an in-store POS transaction is conducted, or extract 9-digit OCN9 from PAN if the online transaction is conducted. In step 606, a hash function will apply on the OCN to get a hashing value of Hash(OCN). A hash function can be any of standard cryptographic strength one-way function such as md5, sha1, sha224, sha256, sha384, sha512, etc. For example, Hash (OCN)=sha1(OCN). For online transaction, the 20-digit OCN is not available, the hashing value of Hash(OCN9) will be used. In one of the preferred embodiments, the Hash (OCN9)=sha1^106(OCN9) will be used. Where sha1^k (OCN9) is defined as sha1(sha1^(k−1)(OCN9)) and 106=1,000,000. That is, Hash(OCN9) is defined as applying sha1 a million time on a shorter 9-digit OCN9 for security reason. In step 608, the web service will check whether the Hash(OCN) is in the valid OCN hashing list for a given account using the Name on the card as the account name. If Hash(OCN) is not in the valid OCN hashing list, it will go to step 612 to reject the OCN and trigger alert if necessary. Otherwise it will go to the next step 610 to check if the OCN has been used before in the OCN rejection list. If yes, it will go to step 612 as well, otherwise, the OCN is accepted and authenticated as a valid OCN then the OCN is added into the used OCN rejection list, and/or delete it from the valid OCN hashing list. If the request is from an online transaction, Hash(OCN9) will be used to check against the valid OCN9 hashing list instead. For example, a Track 1 information as shown in Table 1 has been received by the Validation Web Service at step 602, then in step 604 extracts the 20-digit OCN from Track Discretionary data field and the OCN='11012794867206533120'. In the step 606, Hash (OCN)=sha1(11012794867206533120)= 3a0e187c0984d3ab9ea441158ec985d671157760, then in step 608, it will check whether the Hash(OCN) is in the valid OCN hashing list as shown in Table 2 or not. In this example, it found it in the first row of Table 2 and check this Hash (OCN) hasn't been used before, therefore this OCN is approved. In one of preferred embodiments, the first row hashing value entry of Table 2 will be deleted to prevent the same OCN will be used in the future transaction. Remember the authentication server only stores the valid OCN hashing list in Table 2 not the OCN list itself which can only be found in the once card and not in the server for security reason. This point will be elaborated further in the provisioning process described in the next couple paragraphs. Similarly, if an online transaction validation request information, for example Name="SMITH/JAMES", PAN= '5426241101279480' and Expiration Date='09/12', is received in step 602, then the 9-digit OCN9 will be extracted from PAN, which in this example will be '110127948' in step 604, the Hash(OCN9)=sha1^1,000,000(110127948)= fb9abb7ef78bec3698795fdec150219efbbfa69c in step 606, then in step 608 found the OCN9 hashing value in the valid OCN9 hashing list as shown in the first row of Table 3, and did not find it in the rejection list, thus approve the OCN9 and then delete the Hash(OCN9) entry from the valid OCN9 hashing list. Likewise, for security reason, the OCN9 list is not stored in the authentication server but only the valid OCN9 hashing list can be found in the server.

Figure 7:
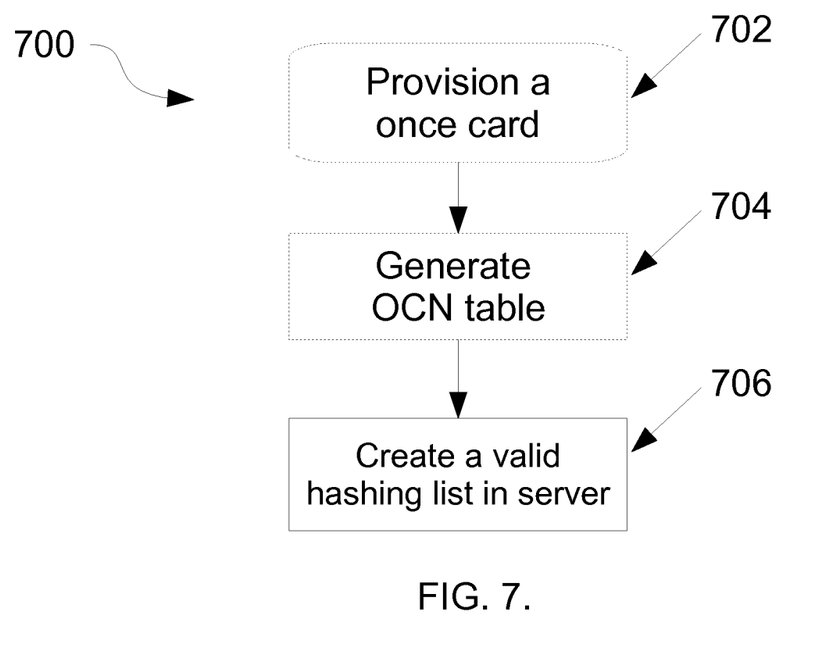
FIG. 7 is a flow chart of an example method of a once card provisioning process.

FIG. 7 illustrates a flow chart of an example method 700 of a once card provisioning process. In step 702, start a provision a new once card. In step 704, generate a set of 20-digit non-duplicated random numbers, for example, 1,500 of them as OCNs. Write the set of 20-digit non-duplicated OCNs into a new once card flash memory as an OCN table. In step 706, use the same set of 20-digit non-duplicated OCNs to generate a valid OCN hashing list by applying a hash function on each OCN number. Then the valid OCN hashing list will be stored in the authentication server to be used in the validation web service described in step 608. For example, a hash function can be a sha1( ). The correspondent valid OCN9 hashing list can be derived from the same set of 20-digit non-duplicated OCNs by extracting the leading 9-digit OCN9 then applying the same hashing function for k times, for example k=1,000, 000. The correspondent valid OCN9 hashing list will be stored under the same account as the valid OCN hashing list in the authentication server to be used in the validation web service described in step 608 when an online transaction submitted for validation. Both original OCNs and OCN9s will be deleted and will not be stored in the authentication server once the provision process is completed for security reason. The Table 2 below is an example OCN table in a once card and its correspondent valid OCN hashing list in the server and the Table 3 is the correspondent OCN9 with its valid OCN9 hashing list in the server.

TABLE 2

| 20-digit OCN table in a once card | Correspondent valid OCN hashing list in the server |
|---|---|
| 11012794867206533120 | 3a0e187c0984d3ab9ea441158ec985d671157760 |
| 30939043058477821952 | f3f559860322cd49b3fd56f176ad4e8854e0155b |
| ... | ... |
| 76098590935513481216 | f2a6bda73b763ee8450b1a93b8c8b8ac482efd8e |

TABLE 3

| 9-digit OCN9 (leading 9-digit of 20-digit OCN) | Correspondent valid OCN9 hashing list in the server |
|---|---|
| 110127948 | fb9abb7ef78bec3698795fdec150219efbbfa69c |
| 309390430 | 1fc738d6a597db941ebd9c885cdbb326dfb3386e |
| ... | ... |
| 760985909 | 045536e6e32235ceb157decfd5bcd18ce146633b |

Figure 8:
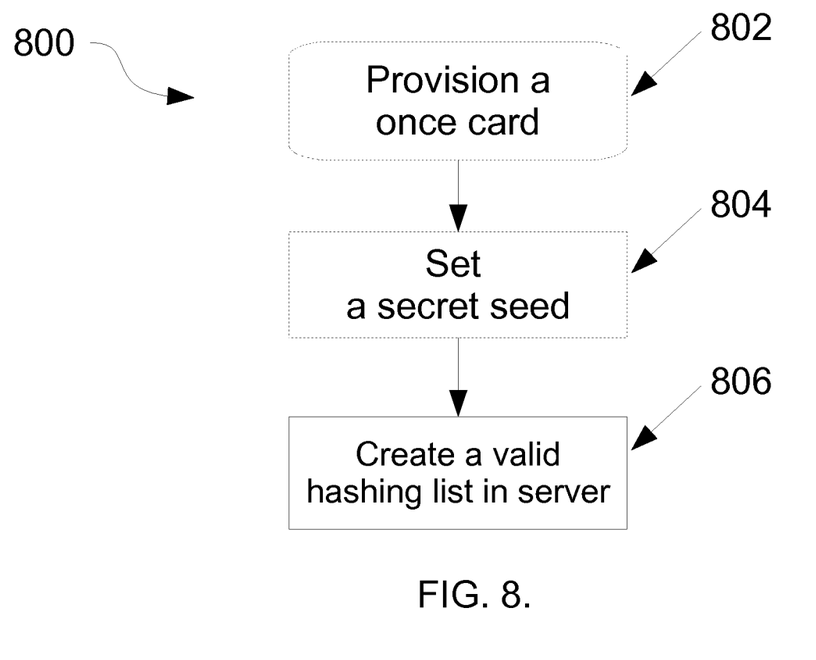
FIG. 8 is a flow chart of another example method of a once card provisioning process.

FIG. 8 illustrates a flow chart of another example method 800 of a once card provisioning process. In step 802, start a provision a new once card. In step 804, set a secret seed for a predetermined algorithm, for example, an event driven OTP generator and write the secret seed into the once card. In another preferred embodiment, the secret seed can be generated from a random number generator built-in in the OCN generator embedded in the once card. In step 806, use the same secret seed set in step 804 to run the predetermined algorithm in the server to create a set of 20-digit non-duplicated numbers, for example 1,500 of them as OCNs. Then use the same set of 20-digit non-duplicated OCNs to generate a valid OCN hashing list by applying a hash function on each OCN number. The valid OCN hashing list will be stored in the authentication server to be used in the validation web service described in step 608. For example, a hash function can be a sha1( ). The correspondent valid OCN9 hashing list can be derived from the same set of 20-digit non-duplicated OCNs by extracting the leading 9-digit OCN9 then applying the same hashing function for k times, for example k=1,000,000. The correspondent valid OCN9 hashing list will be stored under the same account as the valid OCN9 hashing list in the authentication server to be used in the validation web service described in step 608 when an online transaction submitted for validation. Once the provision process is completed, the secret seed, the 20-digit non-duplicated OCNs and correspondent 9-digit OCN9s will be all deleted and will not be stored in the authentication server. This step is extremely important from security point of view. If the secret seed is stored in the authentication server as the prior art disclosed by Brown in U.S. Pat. No. 7,472,829, once a hacker breaks in the authentication server and steals users' secret seeds, then the hacker can automatically generate all valid VANs without alerting the system. Thus the Brown's system is vulnerable to a centralized secure database attack fraud. In the current invention, the secret seed is discarded after generating the valid OCN and OCN9 hashing lists. Even a hacker breaks into the authentication server and steals all the valid OCN hashing list, it is estimated that it might take them more than 1,000 years to reconstruct a valid 20-digit OCN using an i7 2.8 GHz CPU computation resource. And remember that even spending a huge server farm resource to reconstruct one OCN that can only be used once, presents not much economic incentive for a hacker to do so anymore. Thus the current invention can dramatically reduce the impact of a centralized secure database attack fraud.

Furthermore this user's valid OCN hashing list validation method is compatible with an offline credit card transaction. For example, a credit card swiped by a portable transaction device in an airplane offline, the transaction might not be transmitted for clearance few days later in batch. Meanwhile, the same credit card user might already have few more transactions in between, thus if using an event driven OTP algorithms as the OCN validation method in the authentication server described in the a prior art disclosed by Brown in U.S. Pat. No. 7,472,829, the order of the OCN might not match the OTP generation order anymore thus it is not practical. But the current invention uses the pre-generated valid OCN hashing list to check whether the OCN is valid or not regardless its order thus it is compatible with offline transaction.

In yet another preferred embodiments of the OCN generator 206, shown in FIG. 2, consists of a logic circuit that implement a pre-determined algorithm such as a One-Time Password (OTP) generator defined by OATH standard that contains a first secret seed and a second secret seed. When a user swipes a once card, the sensor 210 will activate the OCN generator 206 to generate a new OCN using a first secret seed. When a user presses a button 204, the button 204 will activate the OCN generator 206 to generate a new OCN using a second secret seed. A leading N-digit of the OCN will be extracted to display on the display 202 as a OCN_N_DIGIT plus a Luhn checksum digit as disclosed in step 508, for example, N=9 as a special case. Using the leading N-digit of OCN is just one example of deriving a OCN_N_DIGIT. Other pre-determined algorithms can be used to derive a OCN_N_DIGIT. For example, the other pre-determined algorithms include but not limited to a trailing N-digit of OCN, or a middle N-digit of OCN, or a hashing function to map the OCN to a N-digit hash value, etc.

In yet another preferred embodiments of an example method 600 of the steps of a validation web service authenticating a once card number includes the step 604, the web service will extract the 20-digit OCN, which is generated by a once card embedded OCN generator 206 using a first secret seed, from either Track 1 or Track 2 Discretionary data if an in-store POS transaction is conducted, or extract N-digit OCN_N_DIGIT from PAN if the online transaction is conducted. As an example, the OCN_N_DIGIT is the leading N-digit of a OCN generated by a once card embedded OCN generator 206 using a second secret seed. The N may have value of 5 to 19 depends on the display length. For example, OCN_7_DIGIT is the leading 7-digit of a 20-digit OCN or other pre-determined algorithms of mapping 20-digit OCN to a 7-digit OCN_7_DIGIT. Likewise, OCN_9_DIGIT, OCN9 in shorthand, is the 9-digit OCN_9_DIGIT derived from a 20-digit OCN. In step 606, a hash function will apply on the OCN to get a hashing value of Hash(OCN). For example, Hash(OCN)=sha1(OCN). For online transaction, the 20-digit OCN is not available, the hashing value of Hash (OCN_N_DIGIT) will be used. In one of the preferred embodiments, the Hash(OCN_N_DIGIT)=sha1^10k (OCN_N_DIGIT) will be used. Where sha1^k (OCN_N_DIGIT) is defined as sha1(sha1^(k−1) (OCN_N_DIGIT)) and k=15−N if N<15, k=1 if N>=15. For example, if N=7, then k=8 and 10k=10**8=100,000,000. That is, Hash(OCN7) is defined as applying sha1 one hundred million time on a shorter 7-digit OCN7 for security reason. In step 608, the web service will check whether the Hash(OCN) is in the valid OCN hashing list as before for authentication. If the request is from an online transaction, Hash (OCN_N_DIGIT) will be used to check against the valid OCN_N_DIGIT hashing list instead for authentication.

Figure 9:
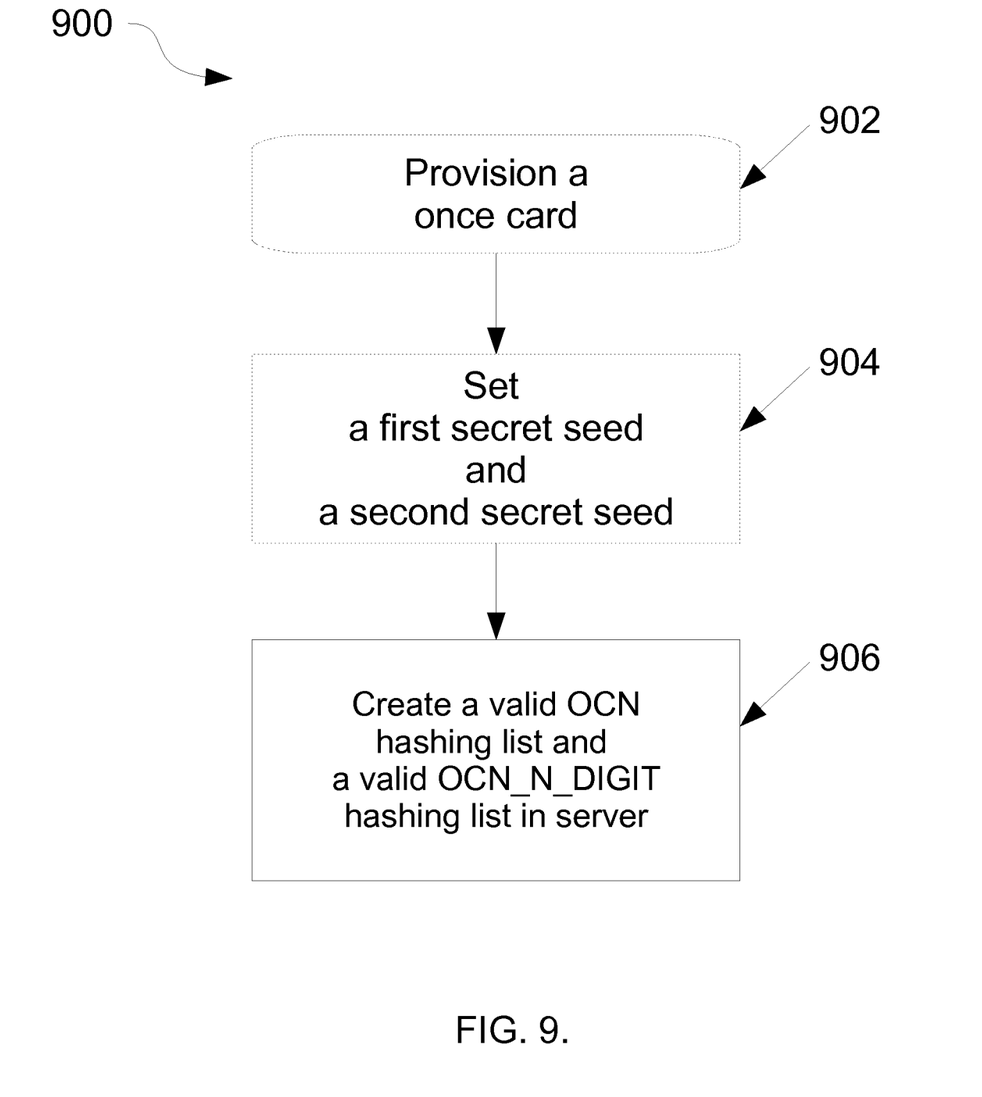
FIG. 9 is a flow chart of yet another example method of a once card provisioning process.

FIG. 9 illustrates a flow chart of yet another example method 900 of a once card provisioning process. In step 902, start a provision a new once card. In step 904, set a first secret seed and a second secret seed for a predetermined algorithm, for example, an event driven OTP generator and write the first secret seed and the second secret seed into the once card. In another preferred embodiment, the first secret seed and the second secret seed can be generated from a random number generator built-in in the OCN generator embedded in the once card. In step 906, use the first secret seed set in step 904 to run the predetermined algorithm in the server to create a first set of 20-digit non-duplicated numbers, for example 1,500 of them as OCNs reserved for in-store transactions. Then use the first set of 20-digit non-duplicated OCNs to generate a valid OCN hashing list by applying a hash function on each OCN number. Then the valid OCN hashing list will be stored in the authentication server to be used in the validation web service for in-store transaction described in step 608. Similarly use the second secret seed set in step 904 to run the predetermined algorithm in the server to create a second set of 20-digit non-duplicated numbers, for example 400 of them as OCNs reserved for online transactions. Then use the second set of 20-digit non-duplicated OCNs to generate a valid OCN_N_DIGIT hashing list by applying a hash function on each OCN_N_DIGIT derived from the second set of OCN number. Then the valid OCN_N_DIGIT hashing list will be stored in the authentication server to be used in the validation web service for online transaction described in step 608. Once the provision process is completed, the first secret seed and the second secret seed, the first OCN set and the second OCN set with its correspondent OCN_N_DIGIT set will be all deleted and will not be stored in the authentication server.

The flow diagrams depicted herein are just examples. There may be many variations to these diagrams or the steps (or operations) described therein without departing from the spirit of the disclosure. For instance, the steps may be performed in a differing order, or steps may be added, deleted or modified.

While embodiments have been described, it will be understood that those skilled in the art, both now and in the future, may make various improvements and enhancements can be made.

What is claimed is:

1. A once card, comprising:
   a plastic substrate with the dimensions of a credit card;
   a magnetic stripe emulator interface disposed in a rear surface;
   a sensor within the plastic substrate at both ends of magnetic stripe emulator interface;
   a display within the plastic substrate in a front surface;
   a button within the plastic substrate;
   a once card number generator embedded in the plastic substrate connected to said magnetic stripe emulator interface, said sensor, said display and said button, and using one of a first secret seed and a second secret seed for generating a new once card number (OCN);
   wherein said sensor for activating said once card number generator to generate a new OCN for in-store shopping transaction using said first secret seed, and said button for activating said once card number generator to generate a new OCN for online shopping transaction using said second secret seed.

2. A once card transaction system, comprising:
   a once card with a display, a button, a magnetic stripe emulator interface, a sensor and an embedded once card number generator using one of a first secret seed and a second secret seed to generate a new once card number (OCN);
   an authentication server;
   wherein, upon activating by said sensor, the embedded once card number generator is capable to communicate with a legacy swipe card reader through the magnetic stripe emulator interface, and said embedded once card number generator generates a once card number (OCN) using said first secret seed, and said OCN can be approved by an authentication entity using the card holder's valid OCN hashing list stored in said authentication server;
   wherein, upon activating by said button, the embedded once card number generator is capable of displaying a new leading N-digit of the OCN (OCN_N_DIGIT) on said display, said OCN_N_DIGIT is derived from a new OCN generated by the once card number generator using said second secret seed, and said OCN_N_DIGIT can be approved by an authentication entity using the card holder's valid OCN_N_DIGIT hashing list stored in said authentication server.

3. A once card transaction system provisioning process, comprising:
   set first secret seed and second secret seed in a once card;
   generate a valid once card number (OCN) hashing list in an authentication server correspondent to said first secret seed;
   generate a valid leading N-digit of OCN (OCN_N_DIGIT) hashing list in an authentication server correspondent to said second secret seed;
   discard said first secret seed and second secret seed in said authentication server.

* * * * *